US011627453B2

(12) United States Patent
Khalid

(10) Patent No.: US 11,627,453 B2
(45) Date of Patent: Apr. 11, 2023

(54) EMERGENCY COMMUNICATION OVER NON-PERSISTENT PEER-2-PEER NETWORK

(71) Applicant: CHARTER COMMUNICATIONS OPERATING, LLC, St. Louis, MO (US)

(72) Inventor: Saran Khalid, Denver, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

(21) Appl. No.: 17/191,283

(22) Filed: Mar. 3, 2021

(65) Prior Publication Data

US 2022/0286833 A1 Sep. 8, 2022

(51) Int. Cl.

| | |
|---|---|
| ***H04W 4/00*** | (2018.01) |
| ***H04W 4/90*** | (2018.01) |
| ***H04W 4/70*** | (2018.01) |
| ***H04W 76/11*** | (2018.01) |
| ***H04W 4/029*** | (2018.01) |
| *H04W 84/18* | (2009.01) |

(52) U.S. Cl.

CPC ............. *H04W 4/90* (2018.02); *H04W 4/029* (2018.02); *H04W 4/70* (2018.02); *H04W 76/11* (2018.02); *H04W 84/18* (2013.01)

(58) Field of Classification Search

CPC ......... H04W 4/90; H04W 4/70; H04W 4/029; H04W 76/11; H04W 84/18

See application file for complete search history.

(56) References Cited

U.S. PATENT DOCUMENTS

| | | | | |
|---|---|---|---|---|
| 9,078,121 | B2 | 7/2015 | Georgescu et al. | |
| 9,307,575 | B2 | 4/2016 | Lee | |
| 10,034,293 | B2 | 7/2018 | Huang et al. | |
| 2008/0248778 | A1* | 10/2008 | Boss ....................... | H04W 4/90 455/404.1 |

FOREIGN PATENT DOCUMENTS

| | | | | |
|---|---|---|---|---|
| AU | 2013335131 | B2 | 5/2014 | |
| EP | 1988724 | A1 | 5/2008 | |
| EP | 28000442 | B1 | 7/2016 | |
| WO | WO-2008035424 | A1 * | 3/2008 | ............ H04W 48/08 |
| WO | 2014098702 | A1 | 6/2014 | |

* cited by examiner

*Primary Examiner* — Erika A Washington

(74) *Attorney, Agent, or Firm* — Meagher Emanuel Laks Goldberg & Liao, LLP

(57) ABSTRACT

Various embodiments comprise systems, methods, and apparatus for emergency, non-persistent peer-to-peer communications to support ad hoc use of proximate UE such as in remote areas with PE coverage gaps. Specifically, UE may configured to initiate emergency communications, and accept/support such emergency communications, such that an ad hoc mesh or message relay network is formed thereby in which (hopefully) someone near the source of the emergency communication may render assistance, or at least one UE in the ad hoc network is capable of accessing a base station, eNB, or gNB so that, for example, the mobile network provider or emergency services may be alerted to the emergency situation.

28 Claims, 4 Drawing Sheets

- USER VOICE/GUI INPUT
- LOSS OF MN COVERAGE
- ATTACHMENT TO MN EDGE BASE STATION
- GPS BOUNDARY CROSSED
- RESPONSE TO BEACON
- IMPACT EVENT
- OTHER 315

UE EMERGENCY/ADVENTURE MODE ENABLED 310

EMERGENCY/ADVENTURE MESSAGE TRANSFER MODE
- OPTIONALLY ENTER LOW POWER MODE
- SCAN FOR AND RECEIVE EMERGENCY MESSAGES/CONFIRMATIONS
- OPTIONALLY VERIFY RECEIVED MESSAGES/CONFIRMATIONS
- TRANSMIT RECEIVED MESSAGES/CONFIRMATIONS, OPTIONALLY INCLUDING RECEIVING UE IDENTIFIER OR LOCATION
- UPDATE DATABASE
- STOP TRANSMITTING AFTER: PREDEFINED TRANSMISSION COUNT, PREDEFINED AMOUNT OF TIME, CONFIRMATION THAT OTHER UE RECEIVED; CONFIRMATION THAT PE RECEIVED, OTHER 320

- USER VOICE/GUI INPUT
- USER NON-RESPONSE WITHIN RESPONSE WINDOW
- IMPACT EVENT
- OTHER 335

EMERGENCY/ADVENTURE SOURCE MODE TRIGGERED 330

- UE IDENTIFIER AND LOCATION
- TIMESTAMP
- LOCATION OF LAST BS
- PREDEFINED MESSAGE(S)
- AUDIO
- STILL/MOVING IMAGERY
- UE POSITION/ORIENTATION WHILE RECORDING IMAGERY
- OTHER 345

UE EMERGENCY MESSAGE GENERATED 340

EMERGENCY/ADVENTURE MESSAGE SOURCE MODE
- OPTIONALLY ENTER LOW POWER MODE
- TRANSMIT GENERATED MESSAGE UNTIL EMERGENCY RESOLVED AND/OR CONFIRMATION OF GENERATED MESSAGE REACHING MN
- PERFORM MESSAGE TRANSFER FUNCTIONS 350

300

EMERGENCY COMMUNICATION OVER NON-PERSISTENT PEER-2-PEER NETWORK

FIELD OF THE DISCLOSURE

The present disclosure generally relates to wireless communications systems and related networks, and more particularly to mechanisms for emergency mode, mobile device peer-to-peer communications in the absence of mobile network coverage.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

User equipment (UE) such as mobile phones may be carried by a user to a remote location where there is no ability to communicate with the mobile network; that is, no base station, eNB, gNB or other provider equipment (PE) nodes deployed in the remote location. In this circumstance, the user is unable to communicate with the mobile network during an emergency situation. Even in populated areas there may be gaps in mobile coverage due to an insufficient number of deployed PE nodes, or obstruction of mobile network communication signal do to terrain features, buildings or other infrastructure, construction materials and the like interfering with mobile network communication signal.

SUMMARY

Various deficiencies in the prior art are addressed by systems, methods, and apparatus for emergency, non-persistent peer-to-peer communications to support ad hoc use of proximate UE such as in remote areas with PE coverage gaps. Specifically, UE may configured to initiate emergency communications, and accept/support such emergency communications, such that an ad hoc mesh or message relay network is formed thereby in which (hopefully) someone near the source of the emergency communication may render assistance, or at least one UE in the ad hoc network is capable of accessing a base station, eNB, or gNB so that, for example, the mobile network provider or emergency services may be alerted to the emergency situation.

In accordance with one embodiment, a method of emergency messaging for user equipment (UE) configured for wireless communication with provider equipment (PE) of a mobile network operator (MNO), comprises: at UE operating in an emergency source mode of operation, transmitting an emergency message including a source UE identifier and source UE location information via a peer-to-peer communication toward other UE; at UE not in communication with the PE and operating in an emergency transfer mode of operation, in response to receiving an emergency message including a source UE identifier and a source UE location, transmitting the received emergency message via peer-to-peer communication toward other UE; at UE not in communication with the PE and operating in an emergency transfer mode of operation, in response to receiving a MNO confirmation of receiving an emergency message, transmitting the MNO confirmation via peer-to-peer communication toward other UE.

In accordance with one embodiment, a system providing emergency communications between user equipment (UE) configured for wireless communication with provider equipment (PE) of a mobile network operator (MNO) comprises: initial UE, unable to communicate with the PE, configured for generating an emergency message including first UE identification and first UE location, and for transmitting the emergency message toward other UE; and final UE, able to communicate with the PE, configured for receiving emergency messages from other UE, and retransmitting the emergency message toward the MNO via the PE.

Additional objects, advantages, and novel features of the invention will be set forth in part in the description which follows, and will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
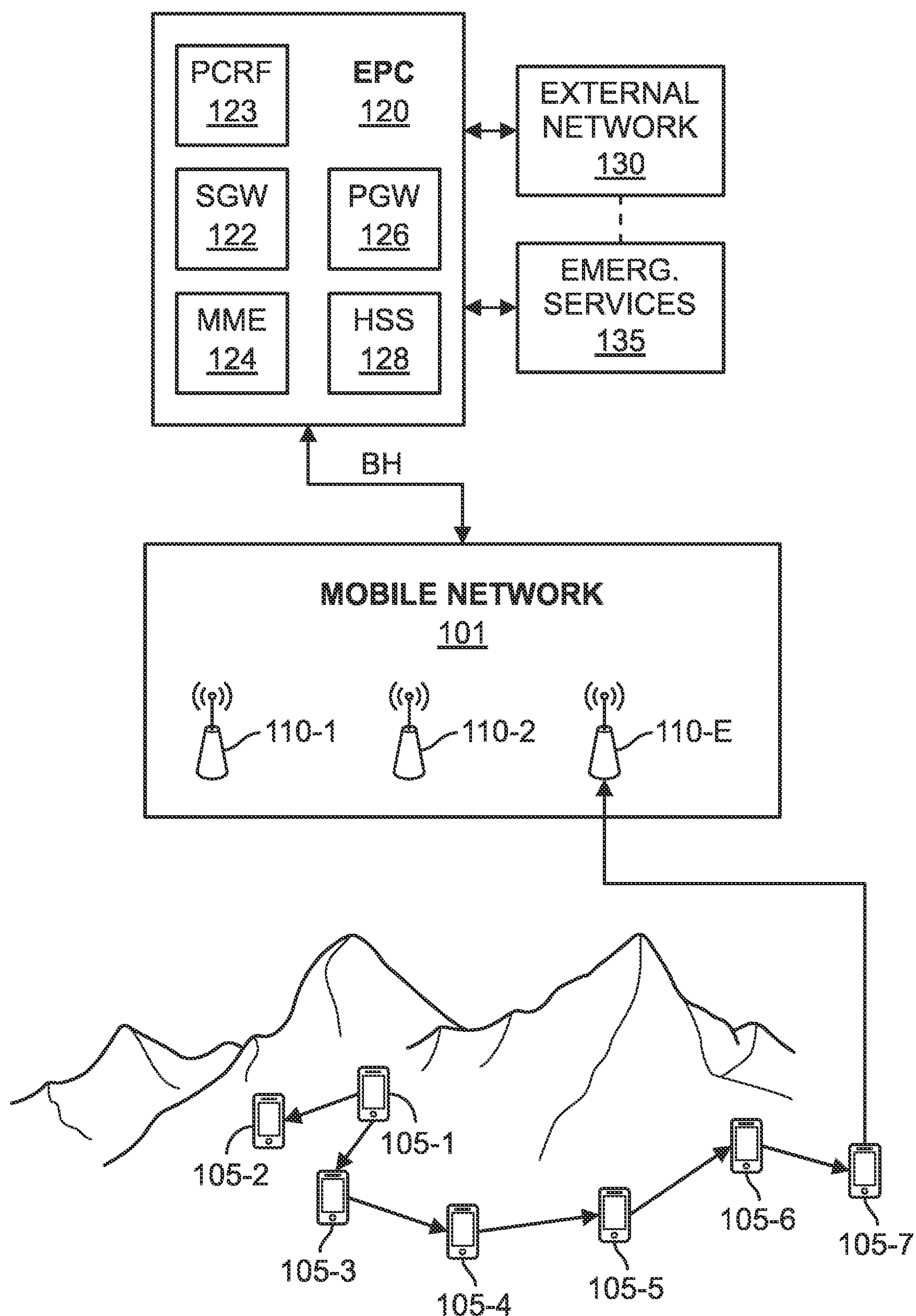
FIG. 1 depicts a high level block diagram of a system benefiting from the various embodiments, and a graphical illustration of an emergency situation addressed by the various embodiments.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

The various embodiments find particular utility within the context of emergency situations where a user is unable to request help because their user equipment (UE) (e.g., mobile phone) is unable to connect to a mobile network due to a lack of mobile network coverage proximate the user. The lack of mobile network coverage may be due to a remote location of the user (e.g., mountain climbing, wilderness hiking, and so on) such that there are no base stations, eNBs, gNBs or other provider equipment (PE) nearby, or that the relevant PE has experienced a failure, or that the user is in a location where mobile network signal simply does not reach.

The various embodiments contemplate UE configured to operate in an emergency mode or adventure mode wherein the UE attempts to communicate with proximate UE in a peer-to-peer manner, which proximate UE may communicate with respective proximate UE and so on to form thereby an ad hoc network of UE such that emergency messages and/or other data may be propagated therebetween and ultimately to PE capable of providing backhaul and UE services delivery functions such as for emergency communications to rescue services. The various embodiments also provide a computer implemented method by which UE may automatically or manually enter/exit the emergency/adventure mode, support user interaction within the emergency/adventure mode, and generally operate in accordance with the system and UE functions described herein.

FIG. 1 depicts a high level block diagram of a system benefiting from the various embodiments, and a graphical illustration of an emergency situation addressed by the various embodiments.

Referring to FIG. 1, user equipment (UE) 105 are configured for wirelessly communicating with provider equipment (PE) 110 of a 3G, 4G/LTE, and/or 5G mobile network, which PE 110 is configured for communicating with an evolved packet core (EPC) 120 (or similar) via one or more backhaul networks BH. The EPC 120 is configured for providing various mobile services to the UE, such as from/to external networks 130, and emergency services networks 135.

The UE 105 may comprise any type of wireless device configured for use in accordance with the various embodiments, such as mobile phones, laptops, tablets and the like, though generally described herein as mobile phones. The various embodiments contemplate the UE 105 are configured to access network services (e.g., voice, streaming media, data upload/download etc.) via at least one mobile network (MN) radio access technology (RAT) such as 3G, 4G/LTE, and 5G and the like. Most UE are also configured to access network services via PE implementing wireless access points (APs or WAPs) of a WiFi network (e.g., 802.11xx networks). In accordance with the various embodiments, the UE 105 are at least able to access MN radio access networks (RANs), and further able to communicate with other UE 105 in a peer-to-peer manner using MN RAT such as via existing 4G/LTE/5G protocols as modified to support such communications (optionally in accordance with mobile network operator permissions and/or requirements).

The PE nodes 110 may comprise macrocells, small cells, microcells and the like such as eNodeBs (eNBs), cellular network base stations, 4G/5G repeaters, and similar types of provider equipment or logical radio nodes (e.g., gNBs) derived therefrom. The PE nodes 110 may include nodes that use licensed 3G/4G/LTE/5G spectrum, unlicensed spectrum such as citizens broadband radio service (CBRS) spectrum, or a combination of licensed and unlicensed spectrum.

Each PE node 110 provides network services to UE 105 via respective radio bearer (channels/resources) which are managed by various Radio Resource Management functions, such as Radio Bearer Control, Radio Admission Control, Connection Mobility Control, Scheduling of UEs in both uplink and downlink and so on.

As depicted in FIG. 1, the EPC 120 comprises several network elements; namely, a Serving Gateway (SGW) 122, a Policy and Charging Rules Function (PCRF) 123, a Mobility Management Entity (MME) 124, a Packet Data Network (PDN) Gateway (PGW) 126, and a Home Subscriber Server (HSS)/Authentication, Authorization and Accounting (AAA) server 128. Other network and management elements are typically included within and/or used to manage an evolved packet core, and related communications therewith as will be known to those skilled in the art.

The SGW 122 and PGW 126 handle user data or data plane (DP) functions; they transport internet protocol (IP) data traffic (i.e., incoming and outgoing packets) between the User Equipment (UE) 105 and the external networks 130. The external networks 130 may comprise any external network, such as an IP Multimedia Core Network Subsystem (IMS).

The SGW 122 is a point of interconnection between the radio-side (e.g., via a backhaul connection to the mobile network 101) and the EPC 120, and serves the UE 105 by routing the incoming packets from the UE 105 and outgoing IP packets for the UE 105. The SGW 122 is the anchor point for intra-LTE mobility (i.e. in case of handover between PE nodes 110 such as eNodeBs) and between LTE, 5G, and other 3GPP access means. The SGW 122 is logically connected to the PGW 126.

The PGW 126 is the point of interconnect for routing packets between the EPC 120 and external packet data networks (e.g., Internet Protocol (IP) networks) 330. The PGW 126 also performs or assists with various functions such as IP address/IP prefix allocation, policy control and charging, and other functions.

The MME 124, HSS 128, and PCRF 123 handle user signaling or control plane (CP) functions; they process signaling related to mobility and security for access to network services by the UE 105. The MME 124 is responsible for the tracking and the paging of UE in idle-mode. It is the termination point of the Non-Access Stratum (NAS). The HSS 128 comprises a database that contains user-related and subscriber-related information, and provides support functions in mobility management, call and session setup, user authentication, access authorization, and other functions. It is noted that the SGW 122 may also be used to handle some control plane signaling in various configurations. The PCRF 123 supports service data flow detection, policy enforcement and flow-based charging functions.

An EPC control plane signaling path within a backhaul connection (BH) may be used to provide UE services delivery functions such as supporting UE messages or signaling provided to the MME 124 or SGW 122. The MME 124 may also interact with various other EPC nodes such as the HSS 128 and SGW 122 to determine information helpful in generating reports and/or providing other information for managing the various networks in implementing the embodiments described herein.

Various elements or portions thereof depicted in FIG. 1 and having functions described herein are implemented at least in part as computing devices having communications capabilities, including for example the UE 105, nodes 110, and various portions of the EPC 120. These elements or portions thereof have computing devices of various types, though generally a processor element (e.g., a central processing unit (CPU) or other suitable processor(s)), a memory (e.g., random access memory (RAM), read only memory (ROM), and the like), various communications interfaces (e.g., more interfaces enabling communications via different networks/RATs), input/output interfaces (e.g., GUI delivery mechanism, user input reception mechanism, web portal interacting with remote workstations and so on) and the like.

As such, the various functions depicted and described herein may be implemented at the elements or portions thereof as hardware or a combination of software and hardware, such as by using a general purpose computer, one or more application specific integrated circuits (ASIC), or any other hardware equivalents or combinations thereof. In various embodiments, computer instructions associated with a function of an element or portion thereof are loaded into a respective memory and executed by a respective processor to implement the respective functions as discussed herein. Thus various functions, elements and/or modules described herein, or portions thereof, may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

Emergency/Adventure Mode

The various embodiments described herein comprise emergency/adventure modes of UE operation and relevant functions, supporting protocol(s), and the like including communications protocols, ad hoc set-up and tear-down, system use cases, various optional modes of operation (e.g., low power/periodic radio scanning, abbreviated messaging transmit/relay functions, etc.) and so on.

The various embodiments provide for emergency, non-persistent peer-to-peer communications to support ad hoc use of proximate UE such as in remote areas with PE coverage gaps. Specifically, UE may configured to initiate emergency communications, and accept/support such emergency communications, such that an ad hoc mesh or message relay network is formed thereby in which (hopefully) someone near the source of the emergency communication may render assistance, or at least one UE in the ad hoc network is capable of accessing a base station, eNB, or gNB so that, for example, the mobile network provider or emergency services may be alerted to the emergency situation. That is, UE 105 may be configured to communicate with other UE 105 such as via the mobile network radio signaling and/or WLAN radio signaling if communication with a PE node 100 is impossible and an emergency communication is desired.

To illustrate, FIG. 1 depicts first user equipment (UE) 105-1 associated with a user experiencing an emergency situation, such as an injury due to a fall, where the user and UE are on the side of a mountain where there is no mobile network service/coverage. The first UE 105-1 enters an emergency mode of operation and begins transmitting emergency messages using a peer-to-peer emergency protocol to any proximate UE, in this case second UE 105-2 and third UE 105-3. Second UE 105-2 is able to receive the emergency messages, but is not within range of any other UE and therefore unable to transfer or forward the messages to any other UE. However, third UE 105-3 is within range of fourth UE 105-4 and therefore able to transfer/forward the emergency messages to UE 105-4. As depicted in FIG. 1, the emergency messages from first UE 105-1 are transferred/forwarded through UE 105-3, 105-4, 105-5, 105-6, and 105-7 to a provider equipment (PE) node 110-E, a node 110 on the edge of the mobile network 101 (i.e., beyond which there are significant areas without network coverage).

In some embodiments, increased transmit power is employed to increase the range of some/all participating UE. Further, the UE associated with an emergency may provide a text or voice message for relay via the ad hoc network, including a GUTI (Globally unique Temporary ID) to identify the UE or the UE user and (optionally) location data of the UE such as resolved global positioning system (GPS) coordinates or an identification of a last-connected cell tower. Further, the UE may enter a low power mode to periodically check for proximate UE. Further the UE may transmit emergency messages via multiple available channels.

In some embodiments, the emergency message of the source UE is repeatedly transmitted from the source UE without regard as to whether subsequent UE have received and transferred/forwarded the emergency messages. In some embodiments, the source UE transmits the emergency message periodically at a predetermined time. In some embodiments, the predetermined time is dependent upon agreed-upon protocols by which all UE in an emergency mode or adventure mode wake up from a low-power state at scheduled times so as to avoid transmitting or attempting to receive UE messages when other UE might still be in a low-power state.

In some embodiments, the emergency messages of the source UE are repeatedly transmitted from the source UE until the source UE receives a confirmation that a first subsequent UE has received and transferred/forwarded the emergency message. Similarly, the first subsequent UE attempts to transfer/forward the emergency message by repeatedly transmitting it toward further subsequent UE until the first subsequent UE receives a confirmation that a further subsequent UE has received and transferred/forwarded the emergency message. When a final subsequent UE connects with a base station or eNB, the final subsequent UE propagates a message confirming this connection back down the chain of transferring/forwarding UEs until the source UE receives confirmation of the connection.

In some embodiments, the emergency or adventure mode functions to merely propagate messages back and forth between UE, such as from a source UE to a base station or eNB (and back, such as a message from rescue personnel communicating to the source you a via the base station/eNB that help is on the way). However, in other embodiments, an active session is created between the source UE and a base station or eNB/gNB via the links including the subsequent UE therebetween. In this manner, a data, audio, and/or video link may be established between the source UE rescue personnel or some other party.

Emergency Modes/Messages

In some embodiments, the UE may enter one of several emergency modes, such as a critical emergency mode (e.g., life-threatening injury) and a non-critical emergency mode (e.g., possibly lost and needing some help), where each mode is associated with different levels of urgency and/or different emergency messages.

In various modes of operation, the UE transmits predefined messages including data such as UE location, UE identifier, timestamp, location of last connected cell tower, one or more predefined messages, an audio recording, still or moving imagery, imagery and UE position/orientation when imagery was recorded by UE, as well as other information. The UE location may comprise a GPS location or other location data. The UE identifier may comprise a unique identifier associated with the UE itself, such as an International Mobile Subscriber Identity (IMSI), International Mobile Station Equipment Identity (IMEI), a GUTI (Globally unique Temporary ID) and the like.

In some embodiments, the UE may enter the emergency mode in response to user input (e.g., selecting a predefined message indicating the type/severity of an emergency), in response to detecting an impact (e.g., accelerometer indication of a fall while mountain climbing, or a car crash, or other accident), in response to a failure of the user to respond to a query from the UE after detection of an impact event, in response to a failure of the user to respond to a periodic alarm, and so on. In some embodiments, the UE may enter the emergency mode in response to a loss of mobile network coverage. In some embodiments, the UE may enter the emergency mode in response to user manipulation of a graphical user interface (GUI), such as associated with a location/hiking application.

In various modes of operation, the transmit power of the UE is increased immediately or increased over time such as in response to a failure to receive a message from subsequent UE confirming reception by the subsequent UE of the emergency message being transmitted.

Coordinated Low-Power Mode

The emergency mode may include a low-power mode, wherein the UE is held to reduced power level operations with periodic attempts to communicate to other UE via an emergency protocol, such as an emergency mode or adventure mode protocol. The periodic communication may be defined in accordance with an emergency communications protocol to coordinate initial emergency transmission and subsequent relay of the emergency transmission. For example, UE may emerge from a low power mode for a short period of time (e.g., 5, 10, or 15 seconds) at predefined times such as a specific seconds count (e.g., 00, 15, 30, or 45) of each minute, or every other minute, or every third minute etc.. In this manner, UE operating in either of an “emergency source mode” (i.e., transmitting emergency messages) and an “emergency transfer mode” (i.e., relaying any received emergency messages toward other UE) may all exit the power saving state at the same time and thereby avoid missing emergency messages transmitted from other UE.

Figure 2:
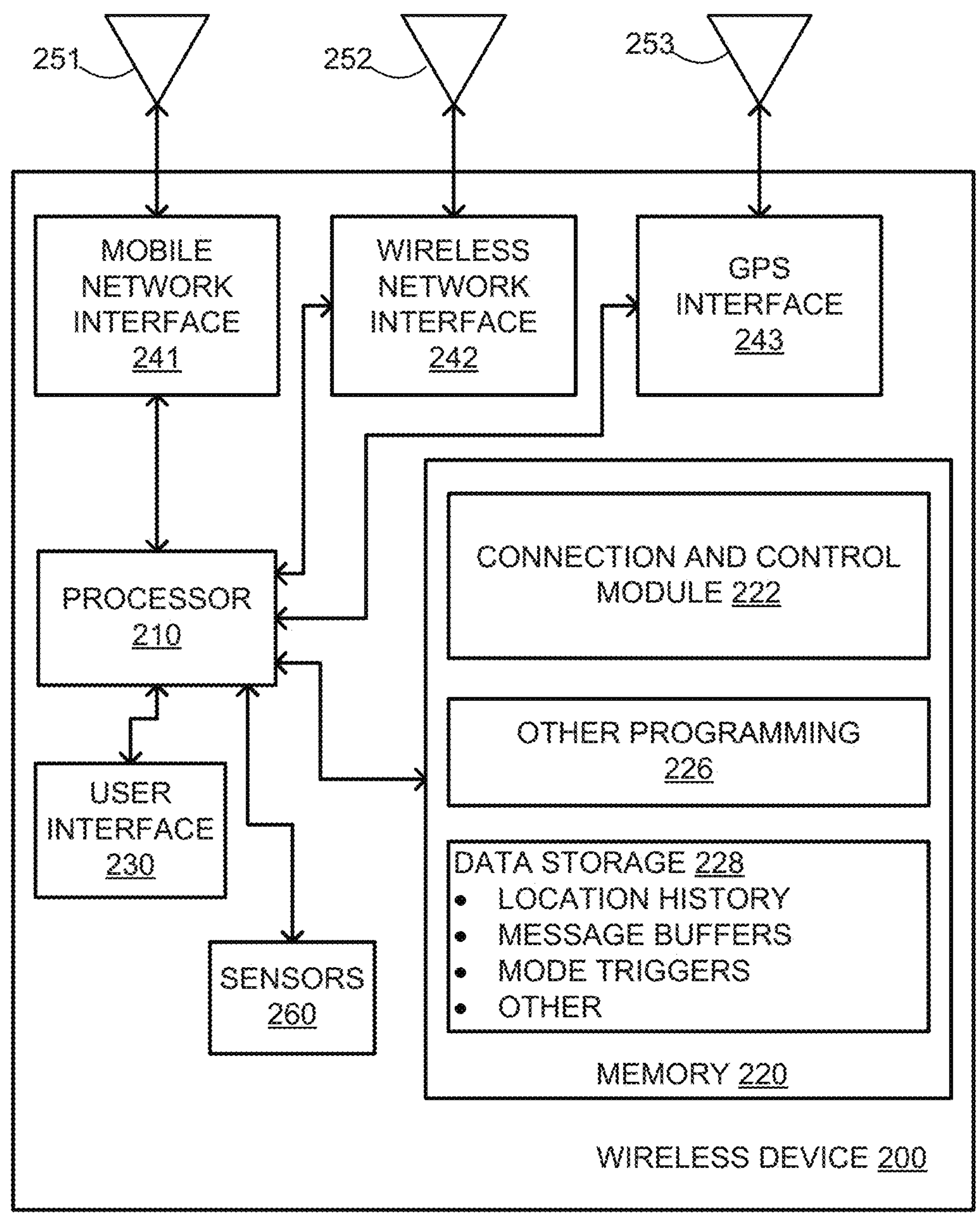
FIG. 2 depicts a high-level block diagram of an exemplary wireless device suitable for use in the various embodiments.

FIG. 2 depicts a high-level block diagram of an exemplary wireless device suitable for use in the various embodiments. Specifically, the wireless device 200 of FIG. 2 is suitable for use in implementing the UE 105 described above with respect to the system of FIG. 1.

The wireless device 200 of FIG. 2 is depicted as including one or more processor(s) 210, a memory 220, a user interface 230, a mobile network interface/transceiver 241 and antenna 251, a wireless network interface/transceiver 242 and antenna 252, and a global positioning system (GPS) interface 243 and antenna 253, and various optional sensors 260.

The processor(s) 210 is coupled to, and adapted to cooperate with, the memory 220, the user interface 230 and the communications interfaces/transceivers 241-242 as well as various other support circuitry (not shown) to provide the various functions as described herein with respect to the wireless device 200, local device 110 and the like.

Memory 220 includes random access memory (RAM), read only memory (ROM), and/or flash memory, and stores information in the form of data and instructions. These instructions that can be executed by processor(s) 210. Various types of instructions may be stored in memory 220. For instance, memory 220 may store instructions that control the operation of communication interfaces/transceivers 241-242, the operation of user interface 230 as well as the operation of other elements within the wireless device 200.

The user interface 230 facilitates the exchange of information with a user. The user interface 230 may comprise various user input and output devices, such as a keyboard, a display device, a touch screen display device, audio speakers and the like to enable user to enter information into the wireless device 200 as well as view information provided by the wireless device 200.

The mobile network (MN) interface 241 and antenna 251 as depicted herein are configured to support communications with a mobile/cellular network, such as a 3G, 4G/LTE 5G or other mobile network. In an emergency mode of operation, the mobile network interface 241 and antenna 251 may be used to support peer-to-peer communications with other wireless devices 200 or UE 105 such as described herein.

The wireless network interface 242 and antenna 252 as depicted herein are configured to support communications with wireless local area networks/systems (WLANs) such as Wi-Fi hotspots established by other wireless/mobile devices 200 110 operating as Wi-Fi hotspot anchors. In an emergency mode of operation, the wireless network interface 242 and antenna 252 may be used to support peer-to-peer communications with other wireless devices 200 or UE 105 such as described herein.

The GPS interface 243 and antenna 253 as depicted herein are configured to receive and process GPS location information or similar information from another satellite-based location system, or terrestrial location system.

The optional sensors 260 may comprise temperature sensors, impact sensors (e.g., accelerometers), position sensors, and the like.

The memory 220, generally speaking, stores programs, data, tools and the like that are adapted for use in providing various functions as described herein with respect to the figures. For example, the memory 220 is depicted as storing instructions associated with a connection and control module 222, other programming 226 as well as data storage 228 (including storage for location history, message buffers, mode trigger settings, and various other information), which instructions cause the respective modules either individually or in combination to perform the various functions of the embodiments described herein. The memory 220 stores instructions controlling the transmission and reception of data via the various interfaces 241-242 in accordance with the appropriate communications protocols, data and control formats, timing requirements, packet structures and the like.

Generally speaking, the UE 105 implemented as described with respect to wireless device 200 (or similar) normally operate in a standard manner whereby MN communications and WLAN communications are facilitated in accordance with the requirements of the various applications stored in memory 220 and executed via the processor 210 (e.g., voice, data, streaming media, etc.).

In the various embodiments discussed herein, the UE 105 includes additional programming to enable the various functions described herein with respect to the various embodiments. Specifically, UE according to these embodiments are capable of peer-to-peer messaging with other UE via at least one of a plurality of techniques, such as by forming an ad hoc network or providing simple unacknowledged message transmission, by simple acknowledged message transmission (i.e., ACK/NACK), or via other techniques. For example, in an ad hoc network embodiment, each UE (upon awakening if in a low power mode), may enter a discovery mode of operation wherein the UE discovers proximate UE and establishes a connection thereto using the MN radio or WLAN radio. Upon discovering proximate UE, an ad hoc mesh or message relay network may be formed to convey emergency messages.

Further, the UE may communicate with each other via one or both of the MN interface 241 and WLAN interface 242. Further, the UE may selectively use elevated or even maximum transmission power for such communications to increase the likelihood of other UE receiving an emergency message. Further, UE subsequent to emergency message source UE may retransmit emergency messages without acknowledging or confirming retransmission to the source UE (or prior UE in a sequence of message retransmitting UE).

The various embodiments generally contemplate the use of peer-to-peer communication between mobile devices during, for example, an emergency or distress situation of a mobile device subscriber where mobile network coverage is not available (e.g., no base stations, eNBs, gNBs etc.). In particular, the various embodiments contemplate a communication chain formed of multiple peer-to-peer links between mobile devices such that a mobile device subscriber may signal a need for assistance thereby.

Various embodiments comprise a computer implemented method by which UE may automatically or manually enter/exit the emergency/adventure mode, support user interaction within the emergency/adventure mode, and generally operate in accordance with the system and UE functions described herein. For example, the connection and control module 222 may include software instructions which, when executed by the processor 210 and related circuitry/modules of the wireless device 2000, provide an emergency/adventure application(s) or app(s) which may be enabled to perform the various automatic and manual functions as described herein. The connection and control module 222 may be used to generate a graphical user interface (GUI) as part of the user interface 230 such that user notifications, messages, and the like may be displayed to the user, and user input such as user interactions with the GUI may be received from the user.

Various embodiments may utilize in network or out of network device to device (D2D) communications, such as supported by the LTE Sidelink standard, 5G and the like. It is noted that WiFi communications may also be used, though 4G/LTE, 5G and other mobile network communications generally have much greater range. Further, message format, data/packet structures and the like may be provided in accordance with existing standards or adapted in various embodiments. In some embodiments, carrier permissions and/or other support from a cell phone carrier or other mobile network services provider may be required so as to enable devices do enter an emergency or adventure mode, enable peer-to-peer operation as described herein, exceed normal transmission power limitations, terminate a peer-to-peer communication at provider equipment and so on.

In various embodiments, the type of emergency messages that may be used depend upon the available quality of service (QoS) of the ad hoc mesh or message transfer network. For low QoS situations, which are likely to be most situations, simple messages with text and possibly audio are appropriate. In the case of higher available QoS, video messages or even streaming video may be possible.

In some embodiments, user interaction with a GUI such as an "emergency console" of an emergency mode app running at the source UE is used to initiate an emergency mode of operation and establish, via the GUI, a means by which a user may input text, voice, images, video and the like into one or more emergency messages to be transmitted via the ad hoc mesh or message relay network.

Further, the emergency mode app may support user interaction at intermediate or subsequent UE (i.e., UE receiving emergency communications for further transmission/relay) to transmit confirmation or acknowledgement messages back toward the source UE, to automatically or manually verify or authenticate the emergency message or the source UE associated with the emergency message, and to perform other functions such as described herein. For example, the app may generate alerts (e.g., audible, visual, vibration, etc.) indicating that proximate UE are associated with an emergency situation. Further, the app may support a chat function or voice message function between source and subsequent UE. Further, the app may be used to generate updated messages associated with an emergency situation such as to inform source UE that help is on the way, or that the source UE user should travel in a particular direction to find help or shelter or water, or to request confirmation from source UE that the emergency situation is resolved, or to similarly inform other intermediate/subsequent UE.

Further, the app may be used to automatically or manually indicate that a received emergency message is associated with a situation that has been resolved, or with a false/mistaken emergency message, or that the emergency message and/or source UE should be ignored for some reason. In various embodiments, users may opt in or opt out of emergency/adventure mode entirely, or of receiving/relaying initial emergency messages or messages of a non-critical nature, or of performing any manual interaction with the service (e.g., while allowing automatic relaying of messages).

Figure 3:
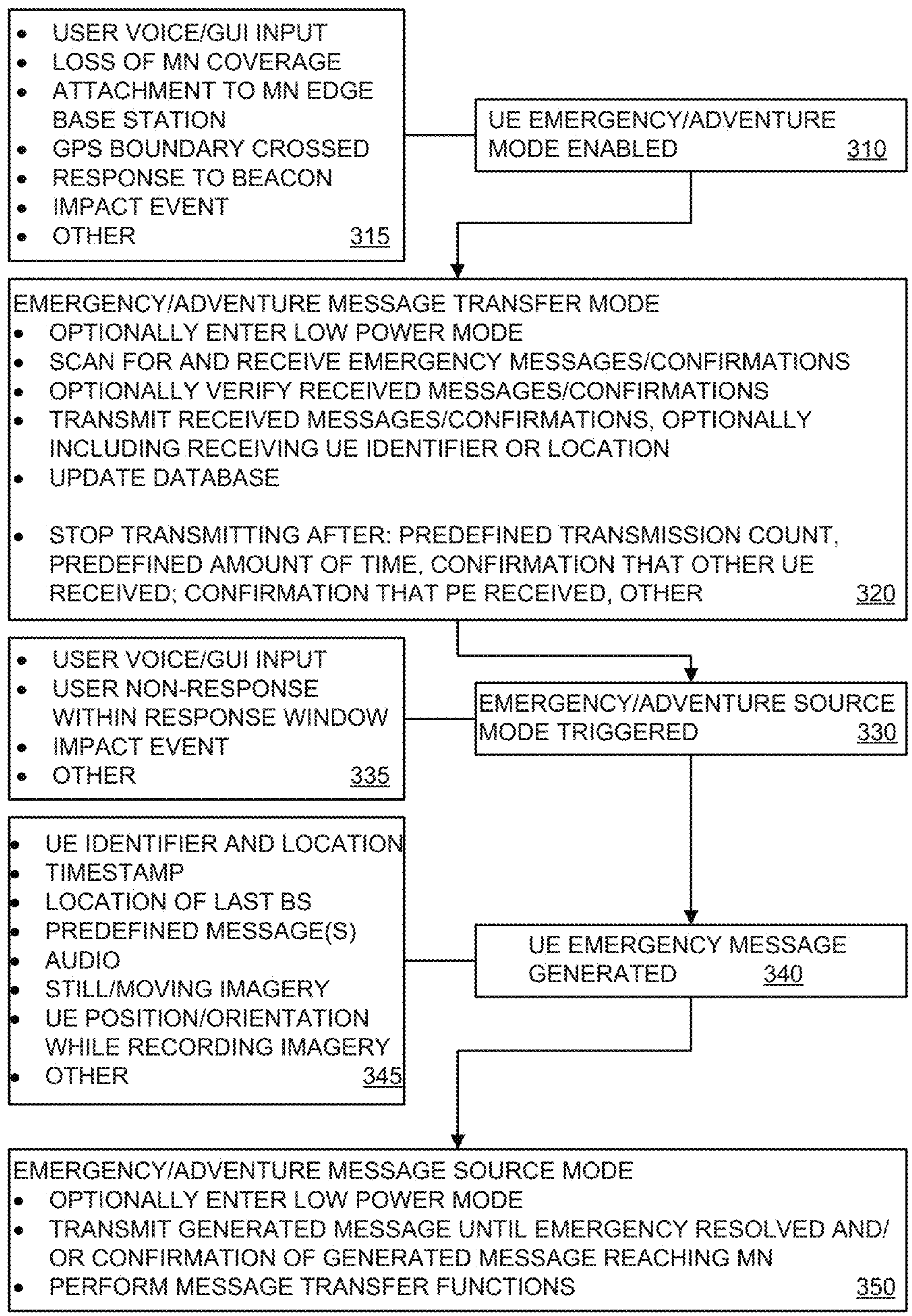
FIG. 3 depicts a flow diagram of methods in accordance with some of the embodiments.

FIG. 3 depicts a flow diagram of methods in accordance with some of the embodiments. Specifically, the method 300 of FIG. 3 depicts UE operation in accordance with several embodiments as discussed herein.

At step 310, a UE manually or automatically enters/enables an emergency mode or adventure mode or operation. Referring to box 315, the UE may enter this mode of operation manually (i.e., in response to user input) such as via voice input or selection of a relevant function via the graphical user interface (GUI) of the UE. The UE may enter an emergency mode or adventure mode or operation automatically, such as in response to some indication of the UE being in a potential emergency situation or remote location, such as a loss of mobile network coverage, attachment to MN edge base station (i.e., a base station bordering an area of poor coverage), the crossing of a GPS boundary (i.e., entering into a national park or other wilderness area), in response to a beacon (e.g., a device indicative of danger or remoteness), an impact event (e.g., a UE accelerometer or other sensor determining that the UE has experienced an impact such as a car crash or a fall), and/or other criteria.

At step 320, a UE enters an emergency/adventure transfer mode in which the UE is configured to operate in a peer-to-peer mode with respect to other UE, so as to receive emergency messages from other UE, or receive message confirmations from other UE that the other UE have received a specific emergency message, to optionally verify received messages and/or message confirmations, to retransmit received emergency messages and confirmations (optionally including one or both of an identifier and location of the receiving UE), and in some embodiments to update a local UE database to indicate received and transmitted emergency messages and confirmations. In various embodiments, retransmission of emergency messages and confirmations is repeated in accordance with a predefined retransmission count, a predefined amount of time, until such time as a confirmation is received indicating that a retransmitted emergency message or confirmation has been received by other UE or by a PE node capable of responding to an emergency message, or according to some other criteria.

Further, this mode of operation may be performed while the UE is in a power savings mode, such as where the UE operates in a low-power mode of operation and "wakes" after a specific amount of time (or at specific times) to scan for emergency messages or confirmations transmitted by other UE. In various embodiments, a coordinated power savings mode is contemplated wherein some or all UE remain in a low-power mode of operation during an agreed-upon low power interval, and some or all UE wake and perform scanning, receiving, and retransmitting functions during an agreed-upon active interval.

The UE remains in emergency/adventure transfer mode until such time as the manual or automatic condition causing the UE to enter this mode changes (e.g., user input indicative of a desire to return to a non-emergency/adventure mode, or a determination by the UE that condition associated with automatically entering this mode has changed (e.g., mobile network coverage from a non-edge base station is restored), or the UE itself is associated with an emergency situation and enters an emergency/adventure source mode.

At step 330, a UE enters an emergency/adventure source mode in response to a triggering condition. Referring to box 335, the triggering condition may comprise user input such as via voice or graphical user interface (GUI), user non-response within a response window (e.g., a failure of a user to indicate to the UE that the user is well within a required time period, such as every hour or every three hours etc.), detection by the UE of an impact event, or some other triggering event. It is noted that in some embodiments, the detection of an impact event by the UE both enables the emergency/adventure mode at step 310, and triggers the emergency/adventure source mode at step 330.

At step 340, a UE emergency message is generated. Referring to box 345, the emergency message should include at least the location of the UE (e.g., GPS coordinates/location, manually entered coordinates/location, identification of last received PE node signals, identification of last PE node the UE was attached to, and so on) and a UE identifier (e.g., IMSI, IMEI, GUTI and the like).

The emergency message may include a timestamp indicative of a time of entering the emergency/adventure message source mode, a time of first emergency message transmission, and/or other useful timestamp information.

The emergency message may include one of several predefined messages, such as messages indicating a particular type or severity of an emergency, such as predefined messages directed toward critical emergencies (injuries, inability to move, trapped in a particular location, lost and not carrying sufficient food/equipment to survive overnight, and the like) or less critical emergencies (lost running low on supplies). These predefined messages may be preprogrammed and manually selected by a user, or they may be partially defined wherein the user may select some indication of the severity of emergency.

The emergency may include audio information, such as a voice recording from the user. The emergency message may include still or moving imagery, such as photographs or video from the UE. The emergency message may include UE position/orientation associated with such photographs or video to provide further information to emergency services personnel. Other information may also be included in the emergency message.

At step 350, the UE operating in emergency/adventure message source mode is configured to operate in a peer-to-peer mode with respect to other UE, and to transmit one or generated emergency messages until such time as the emergency is resolved.

Optionally, UE operating in emergency/adventure message source mode continue to perform retransmission of emergency messages and message confirmations as described above with respect to step 320.

Further, this mode of operation may be performed while the UE is in a power savings mode, such as where the UE operates in a low-power mode of operation and "wakes" after a specific amount of time (or at specific times as discussed above) to transmit generated emergency messages.

The method 300 of FIG. 3 is directed to providing mode of operation by which multiple UE directly or indirectly proximate each other operate in a operate in a peer-to-peer manner to cooperatively transfer emergency messages and message confirmations among themselves with the goal of delivering such emergency messages to UE in communication with a PE node of a mobile network so that emergency services may be summoned on behalf of the UE experiencing the emergency situation.

Emergency Message Flow and Verification

In operation, when an emergency message transmitted by a source UE has been received by a first recipient UE, the user in jeopardy (i.e., the user of the source UE) will be notified via a confirmation message transmitted by the first recipient UE toward the source UE. Similarly, the source UE user will be notified as the emergency message progresses through a sequence of subsequent UE until the emergency message reaches a PE node of mobile network. When the emergency message reaches the mobile network, it may be verified and used to alert emergency personnel and guide emergency personnel toward the source UE. The source UE the user may also be informed by a message from the mobile network delivered via the sequence of UE that help is on the way.

It is also possible that the emergency message may never reach mobile network. In this case, the source UE user will be notified that the message has been successfully received by some user(s) UE but not by PE of the mobile network.

In some embodiments, the source UE user is provided with an opportunity to establish a connection path with other UE such that voice or message communications there between may be used by the source UE two solicit help from users of the other UE. For example, a UE application implementing the various functions described herein may further include a UE to UE messaging application capable of supporting text, voice and/or image messages, duplex voice communications, and the like. In some embodiments, users of other UE may choose to open such a connection path with the source UE.

In some embodiments, false device or false alarm mitigation is provided. Specifically, mitigation steps may be employed at the device level or at the network level to reduce the possibility of false emergency messages being transmitted, false emergency message confirmations being transmitted, "loopback" situations where messages or confirmations are unnecessarily repeated or recycled among UE, and so on.

For example, when a UE receives an emergency message for the first time, the UE may examine various fields in the message to identify the source UE (e.g., GUTI identifier), the location of the source UE (GPS location) and so on to determine whether the received emergency message is legitimate. If the received emergency message does not seem legitimate, then the UE may simply ignore it. If the received emergency message does seem legitimate, then the UE may then retransmit the emergency message as described herein.

When a mobile network operator (MNO) receives an emergency message via the final UE in the sequence of peer-to-peer UE delivering the emergency message, the MNO may perform a verification of the emergency message, of the source UE associated with the emergency message and so on to determine that the source UE user is a legitimate user of the MNO, to determine the location of the source UE (e.g., last location based on U 105 connection to MNO PE 110), and to perform other functions consistent with handling an emergency situation (e.g., alerting first responders, routing the UE message to first responders, establishing an emergency link with the source UE for message o voice communications, and so on). The MNO may forward relevant information to emergency services for an emergency response, such information including the location of the source UE, the type of emergency if known, and so on. The relevant information may further include the location of some or all of the UE forming a sequence of UE in a peer-to-peer communication chain by which the emergency message was provided to the mobile network operator. The MNO will then provide a confirmation message via the UE message chain indicating that emergency services have been notified.

When a MNO receives an emergency message, that message may be processed by the receiving MNO for emergency services purposes irrespective of whether the source UE user is a subscriber to the receiving MNO. Optionally or additionally, if the subscriber is associated with a different MNO, the receiving MNO may forward the emergency message to that MNO for validation and further processing. For example, an emergency source UE including a GUTI (Globally unique Temporary ID) in its emergency message may be identified/authenticated by the MNO as being a MNO subscriber, or being a subscriber of another MNO.

Figure 4:
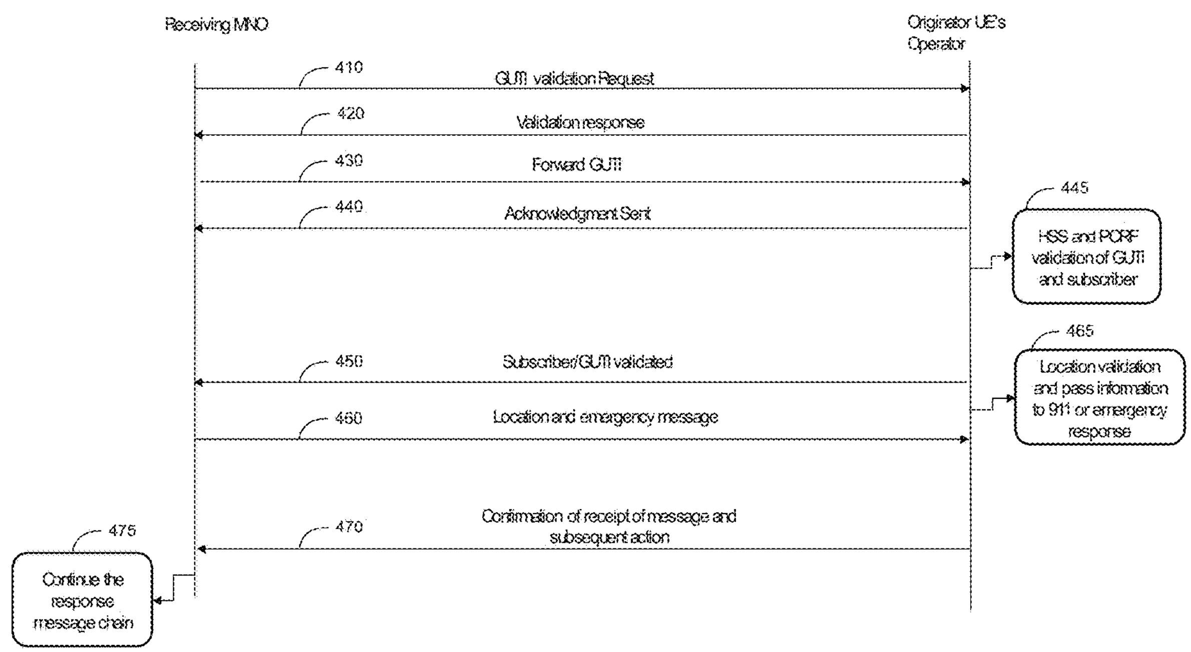
FIG. 4 depicts a flow diagram of a mobile network operator (MNO) protocol in accordance with some of the embodiments.

FIG. 4 depicts a flow diagram of a mobile network operator (MNO) protocol in accordance with some of the embodiments. Specifically, the method 400 of FIG. 4 depicts processing of a received emergency message by a receiving MNO where the user/subscriber associated with the source UE is not a receiving MNO subscriber. In this manner, the MNO associated with the source UE may verify/validate the source UE, may provide any stored location information about the source UE, and may cooperate in any provisioning, permissions, or charging issues associated with enabling communications with the source UE.

At step 410, after receiving an emergency message the MNO identifies the included GUTI (or other identifier), identifies the MNO associated with the source UE, and transmits a GUTI validation request to that MNO. At step 420, the MNO receives a validation response from the MNO associated with the source UE.

At step 430, the MNO forwards the source UE identifier to the MNO associated with the source UE. At step 440, the MNO receives acknowledgment from the MNO associated with the source UE.

At step 445 the MNO associated with the source UE uses its HSS and/or PCRF to validate that the GUTI of the received emergency message is associated with one of its subscribers. At step 450, a subscriber/GUTI validated message is transmitted from the MNO associated with the source UE and received by the MNO.

At step 460, the MNO transmits the source UE location and emergency message to the MNO associated with the source UE. At step 465, the MNO associated with the source UE validate the location of the source UE and forwards the relevant information to emergency services for an emergency response.

At step 470, a confirmation of receipt of message and subsequent action message is transmitted from the MNO associated with the source UE and received by the MNO.

At step 475, a confirmation of emergency services response is transmitted toward the source UE via the PE node(s) proximate the source UE, and various peer-to-peer UE between such PE and the source UE.

The various embodiments contemplate UE configured to operate in an emergency mode or adventure mode wherein the UE attempts to communicate with proximate UE in a peer-to-peer manner, which proximate UE may communicate with respective proximate UE and so on to form thereby an ad hoc network of UE such that emergency messages and/or other data may be propagated to a PE capable of providing backhaul and UE services delivery functions.

In some embodiments, the UE may enter one of several emergency modes, such as a critical emergency mode (e.g., life-threatening injury) and a non-critical emergency mode (e.g., possibly lost and needing some help), where each mode is associated with different levels of urgency and/or different emergency messages.

In various modes of operation, the UE transmits predefined messages including data such as UE location, UE identifier, timestamp, location of last connected cell tower, one or more predefined messages, an audio recording, still or moving imagery, imagery and UE position/orientation when imagery was recorded by UE, as well as other information. The UE location may comprise a GPS location or other location data. The UE identifier may comprise a unique identifier associated with the UE itself, such as an International Mobile Subscriber Identity (IMSI), International Mobile Station Equipment Identity (IMEI), a GUTI (Globally unique Temporary ID) and the like.

In some embodiments, the UE may enter the emergency mode in response to user input (e.g., selecting a predefined message indicating the type/severity of an emergency), in response to detecting an impact (e.g., accelerometer indication of a fall while mountain climbing, or a car crash, or other accident), in response to a failure of the user to respond to a periodic alarm, and so on. In some embodiments, the UE may enter the emergency mode in response to a loss of mobile network coverage. In some embodiments, the UE may enter the emergency mode in response to user manipulation of a graphical user interface (GUI), such as associated with a location/hiking application.

In various modes of operation, the transmit power of the UE is increased immediately or increased over time such as in response to a failure to receive a message from subsequent UE confirming reception by the subsequent UE of the emergency message being transmitted.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like. It will be appreciated that the term "or" as used herein refers to a non-exclusive "or," unless otherwise indicated (e.g., use of "or else" or "or in the alternative").

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof.

What is claimed is:

1. A method of emergency messaging for user equipment (UE) configured for wireless communication with provider equipment (PE) of a mobile network operator (MNO), comprising:

at UE operating in an emergency source mode of operation, transmitting an emergency message including a source UE identifier and source UE location information via a peer-to-peer communication toward other UE;

at UE not in communication with the PE and operating in an emergency transfer mode of operation, in response to receiving an emergency message including a source UE identifier and a source UE location, transmitting the received emergency message via peer-to-peer communication toward other UE;

at UE not in communication with the PE and operating in an emergency transfer mode of operation, in response to receiving a MNO confirmation of receiving an emergency message, transmitting the MNO confirmation via peer-to-peer communication toward other UE.

2. The method of claim 1, further comprising:

at UE in communication with the PE and operating in an emergency transfer mode of operation, in response to receiving an emergency message including a source UE identifier and a source UE location, transmitting the received emergency message toward the PE.

3. The method of claim 2, wherein the source UE identifier comprises a Globally unique Temporary ID (GUTI) configured for use by a mobile network operator (MNO).

4. The method of claim 3, further comprising:

at the MNO, forwarding source UE information toward first responders.

5. The method of claim 3, further comprising:

at the MNO, if the GUTI indicates that the source UE is associated with another MNO, retrieving source UE information from the other MNO and forwarding source UE information toward first responders.

6. The method of claim 1, further comprising:

at UE not in communication with the PE and operating in an emergency transfer mode of operation, periodically retransmitting the received emergency message via peer-to-peer communication toward other UE.

7. The method of claim 1, wherein the transmitted emergency message further includes a transmitting UE identifier and a transmitting UE location.

8. The method of claim 1, further comprising:

at UE not in communication with the PE and operating in an emergency transfer mode of operation, in further response to receiving an emergency message, transmitting a message confirming receipt of the emergency message via peer-to-peer communication toward other UE.

9. The method of claim 8, wherein UE operating in the emergency transfer mode of operation further including respective location information in the transmitted confirmation message.

10. The method of claim 1, wherein UE enter the emergency transfer mode of operation in response to at least one of user input, a loss of mobile network coverage, an attachment of the UE to edge PE of a mobile network, and a crossing of a GPS boundary.

11. The method of claim 1, wherein UE enter the emergency source mode of operation in response to at least one of user input, a failure to receive user input within a predefined response window, and a detection of an imp act.

12. A computer implemented method of emergency mode operation of user equipment (UE) configured for wireless communication with provider equipment (PE) of a mobile network operator (MNO), the method comprising:

in an emergency source mode of operation, transmitting an emergency message including a source UE identifier via a peer-to-peer communication toward other UE;

in an emergency transfer mode of operation, in response to receiving an emergency message including a source UE identifier, transmitting the received emergency message via peer-to-peer communication toward other UE;

in the emergency transfer mode of operation, in response to receiving a MNO confirmation of receiving an emergency message, transmitting the MNO confirmation via peer-to-peer communication toward other UE.

13. The computer implemented method of claim 12, further comprising:

in the emergency source mode of operation, including source UE location information in the emergency message.

14. The computer implemented method of claim 13, further comprising:

in the emergency transfer mode of operation, in response to receiving an emergency message including a source UE identifier and a source UE location, transmitting the received emergency message toward the PE.

15. The computer implemented method of claim 12, further comprising:

in the emergency transfer mode of operation, including current UE location information in the emergency message.

16. The computer implemented of claim 12, further comprising:

in an emergency transfer mode of operation, periodically retransmitting the received emergency message via peer-to-peer communication toward other UE.

17. A system providing emergency messaging between user equipment (UE) configured for wireless communication with provider equipment (PE) of a mobile network operator (MNO), the system comprising:

UE configured for peer-to-peer communication with other UE;

wherein UE in an emergency source mode of operation are configured for transmitting an emergency message including a source UE identifier and source UE location information via peer-to-peer communication toward other UE;

wherein UE in an emergency transfer mode of operation are configured for receiving emergency messages via peer-to-peer communication, and responsively transmitting each received emergency message via peer-to-peer communication toward other UE or to PE of the MNO;

wherein UE operating in an emergency transfer mode of operation are configured to receiving a MNO confirmation of receiving an emergency message, and responsively transmitting the MNO confirmation toward other UE.

18. The system of claim 17, wherein UE are configured to enter the emergency transfer mode of operation in response to at least one of user input, a loss of mobile network coverage, and an attachment of the UE to edge PE of a mobile network.

19. The system of claim 17, wherein UE are configured to enter the emergency source mode of operation in response to at least one of user input, a failure to receive user input within a predefined response window, and a detection of an impact.

20. User equipment (UE) configured for wireless communication with provider equipment (PE) of a mobile network operator (MNO), the UE comprising:

a communications device;

the communications device, in an emergency source mode of operation, transmitting an emergency message including a source UE identifier via a peer-to-peer communication toward other UE;

the communications device, in an emergency transfer mode of operation, in response to receiving an emergency message including a source UE identifier, transmitting the received emergency message via peer-to-peer communication toward other UE, and in response to receiving a MNO confirmation of receiving an emergency message, transmitting the MNO confirmation via peer-to-peer communication toward other UE.

21. The UE of claim 20, wherein the communications device, when in communication with the PE and operating in the emergency transfer mode of operation, in response to receiving an emergency message including a source UE identifier and a source UE location, transmitting the received emergency message toward the PE.

22. The UE of claim 21, wherein the communications device, when in communication with the PE and operating in the emergency transfer mode of operation, in response to receiving a MNO confirmation of receiving an emergency message, transmitting the MNO confirmation via peer-to-peer communication toward other UE.

23. The UE of claim 20, wherein the communications device, when not in communication with the PE and operating in an emergency transfer mode of operation, periodically retransmitting the received emergency message via peer-to-peer communication toward other UE.

24. The UE of claim 20, wherein the communications device, when transmitting the received emergency message via peer-to-peer communication toward other UE, includes in the transmission the UE identifier and location associated with the communications device.

25. The UE of claim 20, wherein the communications device, in further response to receiving an emergency message, transmitting a message confirming receipt of the emergency message via peer-to-peer communication toward other UE.

26. The UE of claim 25, wherein the communications device, when transmitting the confirmation message via peer-to-peer communication toward other UE, includes in the confirmation message transmission the UE identifier and location associated with the communications device.

27. The UE of claim 20, wherein the communications device enters the emergency transfer mode of operation in response to at least one of user input, a loss of mobile network coverage, an attachment of the UE to edge PE of a mobile network, and a crossing of a GPS boundary.

28. The UE of claim 20, wherein the communications device enters the emergency source mode of operation in response to at least one of user input, a failure to receive user input within a predefined response window, and a detection of an impact.

* * * * *